United States Patent
Medford et al.

(10) Patent No.: US 8,509,727 B2
(45) Date of Patent: Aug. 13, 2013

(54) EMERGENCY ALERT SYSTEMS AND METHODS

(75) Inventors: Brad Medford, Austin, TX (US); Kevin B. Walker, Oswego, IL (US); Robert B. Hill, Spring Branch, TX (US); Thomas Scott Webster, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 276 days.

(21) Appl. No.: 11/173,369

(22) Filed: Jun. 30, 2005

(65) Prior Publication Data

US 2007/0004377 A1 Jan. 4, 2007

(51) Int. Cl.
*H04M 11/04* (2006.01)
*H04N 7/167* (2011.01)
*H04N 7/173* (2011.01)

(52) U.S. Cl.
USPC ................... 455/404.1; 725/33; 725/108

(58) Field of Classification Search
USPC ............ 455/414.1, 466, 404.1; 725/33, 725/108
See application file for complete search history.

(56) References Cited

U.S. PATENT DOCUMENTS

| | | | |
|---|---|---|---|
| 6,543,051 B1 | 4/2003 | Manson et al. | |
| 6,564,047 B1 * | 5/2003 | Steele et al. | 455/405 |
| 6,594,703 B1 | 7/2003 | Li | |
| 6,745,021 B1 * | 6/2004 | Stevens | 455/404.1 |
| 6,771,644 B1 | 8/2004 | Brassil et al. | |
| 6,772,433 B1 | 8/2004 | LaJoie et al. | |
| 7,130,389 B1 * | 10/2006 | Rodkey et al. | 379/88.12 |
| 7,409,428 B1 * | 8/2008 | Brabec et al. | 709/206 |
| 7,743,164 B2 * | 6/2010 | Coldren | 709/236 |
| 2003/0069002 A1 * | 4/2003 | Hunter et al. | 455/404 |
| 2004/0049785 A1 | 3/2004 | Czeczkowski et al. | |
| 2004/0242239 A1 * | 12/2004 | Hertz | 455/456.3 |
| 2004/0247090 A1 * | 12/2004 | Nurmela | 379/88.13 |
| 2005/0030977 A1 * | 2/2005 | Casey et al. | 370/485 |
| 2005/0055685 A1 | 3/2005 | Maynard et al. | |
| 2005/0057372 A1 * | 3/2005 | Taylor | 340/901 |
| 2005/0086685 A1 * | 4/2005 | Rahman et al. | 725/33 |
| 2006/0005219 A1 * | 1/2006 | Owens | 725/33 |
| 2006/0020992 A1 * | 1/2006 | Pugel et al. | 725/108 |

FOREIGN PATENT DOCUMENTS

EP 1263243 8/2004

OTHER PUBLICATIONS

Minerva Networks, "Minerva itv manager", http://ww.digitalstudio.net.au/products/min_itv_man.htm, (2003), 2 pgs.

* cited by examiner

*Primary Examiner* — George Eng
*Assistant Examiner* — Nam Huynh
(74) *Attorney, Agent, or Firm* — Wolff & Samson, PC (57) ABSTRACT

A system and method for providing Emergency Alert System (EAS) notifications over Internet Protocol (IP) delivery platforms, including a proxy server coupled to an emergency alert system receiver, a subscriber management database coupled to the proxy server, and an instant messaging server coupled to the proxy server and to the subscriber management server.

10 Claims, 8 Drawing Sheets

California FIPS Codes

A FIPS or Federal Information Processing Standard number is a location code and indicates the geographic area affected by the EAS alert. The FIPS Code is constructed using 6 numeric digits as prescribed by the Federal Communications Commission policies and procedures on EAS located in 47 CFR Part 11. A breakdown of the FIPS Code is as follows:

Digit 1    Sub County, {Usually a ZERO 0 - **}
Digit 2,3  State Code, (California is 06)
Digit 4,5,6 County Code, {From the list below.}

An example for Sacramento, CA in Sacramento County would be 006067.
    SubCounty-0 State-06 County-067

** Currently there are no official sub-divisions of counties, however, they are being implemented in some areas. Contact the local National Weather Service office for the proper sub-county designation.

CALIFORNIA    06

| County | Code | County | Code |
|---|---|---|---|
| Alameda | 001 | Santa Cruz | 087 |
| Orange | 059 | Kings | 031 |
| Alpine | 003 | Shasta | 089 |
| Placer | 061 | Lake | 033 |
| Amador | 005 | Sierra | 091 |
| Plumas | 063 | Lassen | 035 |
| Butte | 007 | Siskiyou | 093 |
| Riverside | 065 | Los Angeles | 037 |
| Calaveras | 009 | Solano | 095 |
| Sacramento | 067 | Madera | 039 |
| Colusa | 011 | Sonoma | 097 |
| San Benito | 069 | Marin | 041 |
| Contra Costa | 013 | Stanislaus | 099 |
| San Bernardino | 071 | Mariposa | 043 |
| Del Norte | 015 | Sutter | 101 |
| San Diego | 073 | Mendocino | 045 |
| El Dorado | 017 | Tehama | 103 |
| San Francisco | 075 | Merced | 047 |
| Fresno | 019 | Trinity | 105 |
| San Joaquin | 077 | Modoc | 049 |
| Glenn | 021 | Tulare | 107 |
| San Luis Obispo | 079 | Mono | 051 |
| Humboldt | 023 | Tuolumne | 109 |
| San Mateo | 081 | Monterey | 053 |
| Imperial | 025 | Ventura | 111 |
| Santa Barbara | 083 | Napa | 055 |
| Inyo | 027 | Yolo | 113 |
| Santa Clara | 085 | Nevada | 057 |
| Kern | 029 | Yuba | 115 |

*FIG. 7*

EMERGENCY ALERT SYSTEMS AND METHODS

FIELD OF THE INVENTION

This disclosure relates generally to the field of Emergency Alert Systems and methods, including providing Emergency Alert System notifications.

BACKGROUND OF THE INVENTION

The Emergency Alert System (EAS) was established by the United States Federal Communications Commission (FCC) in November of 1994 with the approval of Part 11 EAS rules. The EAS replaced the Emergency Broadcast System (EBS) as a tool the United States President and others may use to warn the public about emergency situations. Part 11 of the EAS rules states:

11.1 Purpose.

This part contains rules and regulations providing for an Emergency Alert System (EAS). The EAS provides the President with the capability to provide immediate communications and information to the general public at the National, State and Local Area levels during periods of national emergency. The rules in this part describe the required technical standards and operational procedures of the EAS for AM, FM and TV broadcast stations, cable systems and other participating entities. The EAS may be used to provide the heads of State and local government, or their designated representatives, with a means of emergency communication with the public in their State or Local Area.

11.11 The Emergency Alert System (EAS).

(a) The EAS is composed of broadcast networks; cable networks and program suppliers; AM, FM, Low Power FM (LPFM) and TV broadcast stations; Class A television (CA) stations; Low Power TV (LPTV) stations; cable systems; wireless cable systems which may consist of Multipoint Distribution Service (MDS), Multichannel Multipoint Distribution Service (MMDS), or Instructional Television Fixed Service (ITFS) stations; and other entities and industries operating on an organized basis during emergencies at the National, State and local levels. It requires that at a minimum all participants use a common EAS protocol, as defined in §11.31, to send and receive emergency alerts in accordance with the effective dates in the following tables:

The Emergency Alert System signal includes a Federal Information Processing Standard (FIPS) number, which is a location code indicating geographic areas affected by an EAS alert. A FIPS code number is a six numeric digit code, formatted as prescribed by the FCC in Part 11 of the EAS rules. FIG. 7 is an example, including further description, of FIPS codes for the State of California. While the EAS is useful in many circumstances, typical methods for conveying EAS notifications can be inefficient.

BRIEF DESCRIPTION OF THE DRAWINGS

Embodiments of the invention are illustrated by way of example and not limitation in the figures of the accompanying drawings, in which like references indicate similar elements and in which:

FIG. 7 is a prior art illustration of some Federal Information Processing Standard (FIPS) numbers.

DETAILED DESCRIPTION

The EAS system was created before Internet Protocol (IP) mechanisms were considered for video and audio transport. However, implementing some portion of the EAS in conjunction with available IP platforms can operate to inform a greater number of persons about potential emergency situations in a more efficient fashion. Thus, methods and systems to utilize EAS notifications in conjunction with one or more IP delivery platforms are described herein.

In the following descriptions, for purposes of explanation, numerous specific details are set forth in order to provide a thorough understanding of the various embodiments. It will be evident, however, to one skilled in the art that embodiments of the invention may be practiced without making use of many of these specific details.

Figure 1:
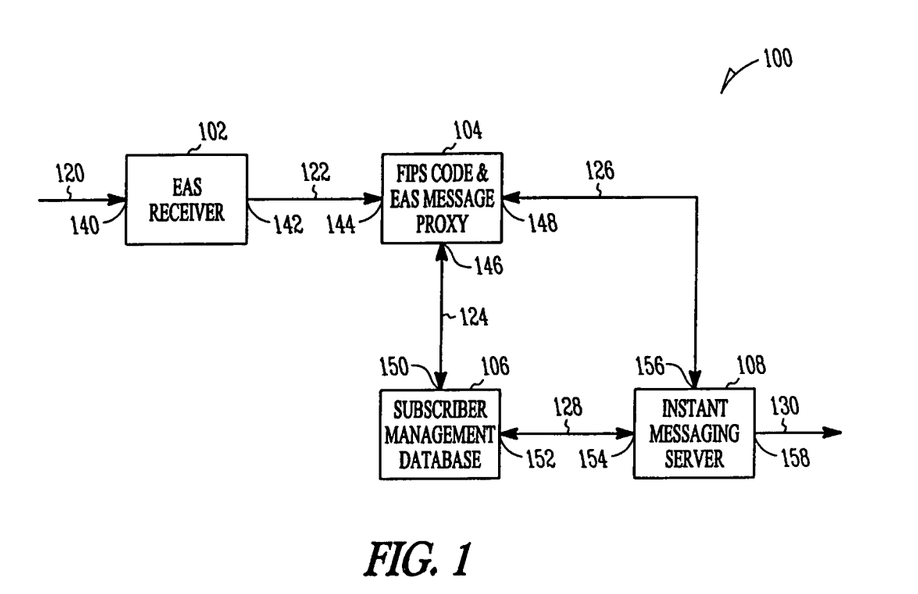
FIG. 1 is a diagrammatic representation of a system to allow EAS notifications to be delivered over IP delivery platforms according to an embodiment of the invention.

FIG. 1 is diagrammatic representation of a system 100 to incorporate EAS signals into one or more IP delivery platforms according to an embodiment of the invention. System 100 may include an EAS receiver 102, a FIPS code and EAS message proxy 104, a subscriber management database 106, and an instant messaging server 108. In various embodiments, FIPS code and EAS message proxy 104 includes a server. In an embodiment, the EAS receiver 102 includes an input 140 to receive EAS signals present on channel 120, and an output 142 coupled to channel 122. In an embodiment, FIPS code and EAS message proxy 104 may include input 144 coupled to channel 122, input/output 146 coupled to channel 124, and input/output channel 148 coupled to channel 126. FIPS code and EAS message proxy 104 may be coupled to channel 122 to enable FIPS code and EAS message proxy 104 to receive outputs from EAS receiver 102 and to further process the outputs.

In an embodiment, subscription management database 106 includes input/output 150 coupled to channel 124. FIPS code and EAS message proxy 104 may be coupled to subscription management database 106 through channel 124, perhaps to enable passing date to subscriber management database 106.

In various embodiments, the data passed may include, but are not limited to, a message ID field and a FIPS code. Passing data is further described below in the description related to FIGS. 1-3, 4A, 4B, and 4C. In an embodiment, channel 124 allows communication in both directions between the FIPS code and EAS message proxy 104 and subscription management database 106. This enables the subscription management database 106 to communicate with the FIPS Code and EAS message proxy 104, for example, that the subscription management database 106 received the date sent by the FIPS Code and EAS message proxy 104.

In an embodiment, instant messaging server 108 includes input/output 156 coupled to channel 126. The FIPS code and EAS message proxy 104 may be coupled to instant messaging server 108 through channel 126, perhaps to enable passing data to instant messaging server 108. In various embodiments, the data passed may include, but are not limited to, a message ID field, an FSK (frequency shift keying) tones field, a text message field, a duration of message field, and a type of message field. Passing data is further described below in the description related to FIGS. 1-3, 4A, 4B, and 4C. In an embodiment, channel 126 allows communication in both directions between the FIPS code and EAS message proxy 104 and instant messaging server 108. This enables the instant messaging server 108 to communicate with the FIPS Code and EAS message proxy 104, for example, that the instant messaging server 108 received the date sent by the FIPS Code and EAS message proxy 104. The communication may include, but is not limited to, an acknowledgement that instant messaging server 108 received one or more message data fields from FIPS code and EAS message Proxy 104.

The subscriber management database 106 may include input/output 152 coupled to channel 128. The instant messaging server 108 may include input/output 154 coupled to channel 128. In some embodiments, channel 128 couples subscriber management database 106 with instant messaging server 108. In an embodiment, channel 128 allows communication in both directions between subscriber management database 106 and instant messaging server 108. Channel 128 may enable subscriber management database 106 to pass affected subscribers lists, including customer premise equipment identifiers, to the instant messaging server 108. In various embodiments, instant messaging server 108 can acknowledge receiving the affected subscriber lists, including the customer premise equipment identifiers, using channel 128.

The system 100 may include the instant messaging server 108 having an output 158 coupled to channel 130, wherein the output 158 may be used by the instant messaging server 108 to broadcast signals created by processing data and information received from both the FIPS code and EAS message proxy 104 and the subscriber management database 106. The broadcast signal may be coupled to one or more customers (not shown in FIG. 1) through one or more IP networks (also not shown in FIG. 1). Various embodiments of the invention, including details concerning the data received by and processed in the instant messaging server 108, are further described below in the description related to FIGS. 1-3, 4A, 4B, and 4C.

In FIG. 1, channels 120, 122, 124, 126, 128, and 130 are shown as a single line, perhaps realized as a single conductor. However, channels 120, 122, 124, 126, 128, and 130 are not limited to a single conductor, and may include multiple conductors or completely separate channels, as would be recognized by one or ordinary skill in the art. Further, channels 120, 122, 124, 126, 128, and 130 are not limited to a particular device or element, and may comprise cables, wires, fiber optics, wireless connections, and other devices and elements that permit the transmission of information from one location to another. Inputs 140 and 144 are not limited to any particular type of input. Outputs 142 and 158 are not limited to any particular type of output. In addition, input/outputs 146, 148, 150, 152, 154, and 156 are not limited to any particular type of input/output, and may include separate devices or elements to perform the input functions and the output functions for data, as would be recognized by one or ordinary skill in the art.

Figure 2:
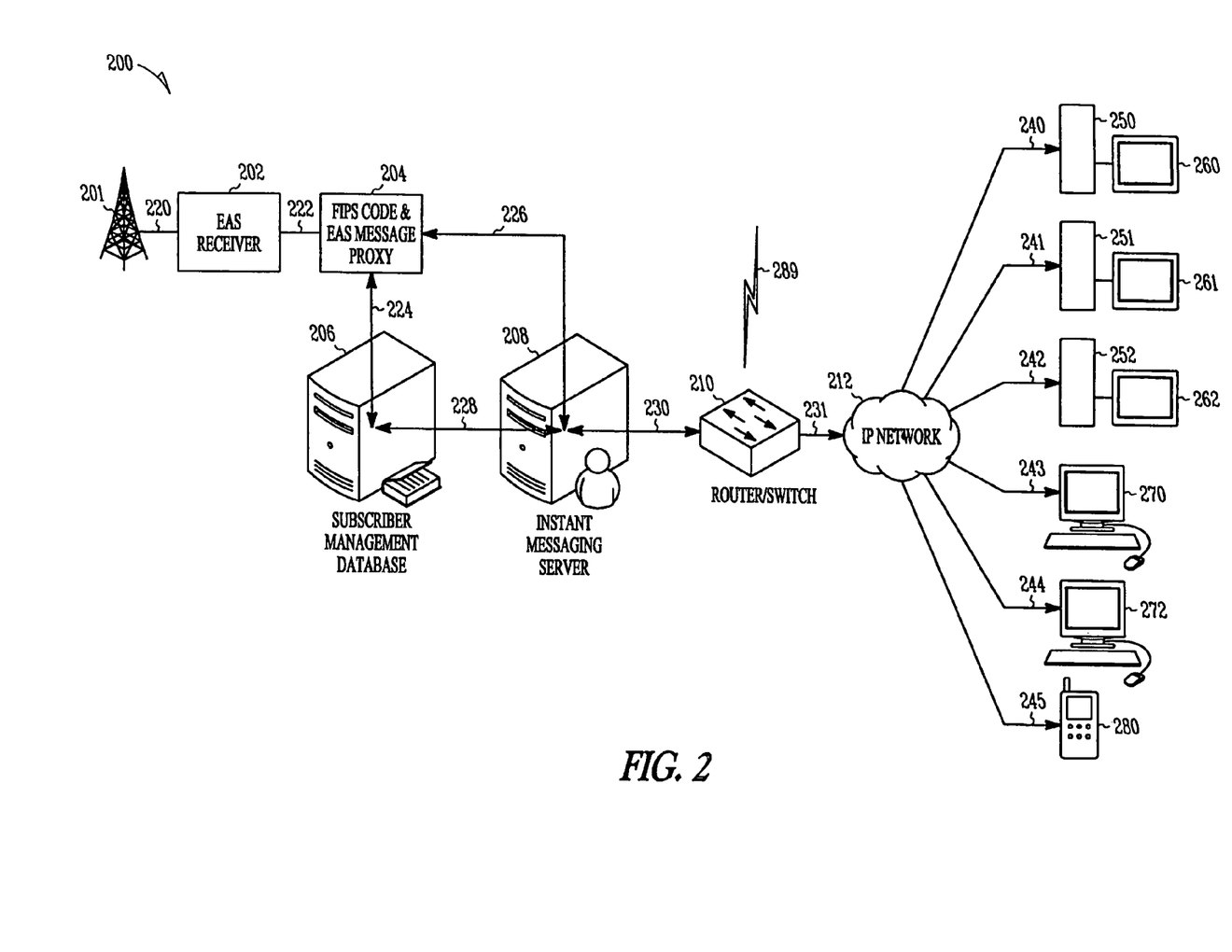
FIG. 2 is a diagrammatic representation of a system to allow EAS notifications to be delivered over Internet protocol delivery platforms according to an embodiment of the invention.

FIG. 2 is a diagrammatical representation of a system 200 for incorporating EAS signals into one or more IP delivery platforms according to an embodiment of the invention. This embodiment of a system 200 may employ antenna 201 to receive an EAS signal. The EAS signal may be broadcast by a local authority or by a designated EAS broadcaster. Antenna 201 is shown by way of example, and not as a limitation. Any other device used to receive EAS signals may be utilized by various embodiments of the invention. In system 200, the antenna 201 may be coupled to EAS receiver 202 through channel 220, to enable EAS signals received at antenna 201 to be coupled to EAS receiver 202. The EAS receiver 202 may perform processing of the EAS signal. For example, EAS receiver 202 may demodulate an EAS message from a carrier frequency used to transmit the EAS signal to the antenna 201. The EAS receiver 202 may be coupled to an FIPS code and EAS message proxy 204 through channel 222.

In various embodiments, FIPS code and EAS message proxy 204 is used to parse and format the EAS signal received from the EAS receiver 202. In various embodiments, parsing includes separating various parts of a message included in the EAS signal into one or more EAS message data fields. In various embodiments, the FIPS code and EAS message proxy 204 includes one or more tables (for example, table 301 of FIG. 3) wherein each table includes one or more message data fields storage blocks (for example, message data fields storage blocks 302, 304, 306, 308, 310, and 312 of FIG. 3). The message data fields storage blocks 302, 304, 306, 308, 310, and 312 of the table 301 may be capable of having the various EAS message data fields associated with a message ID entered and stored within the message data fields storage blocks 302, 304, 306, 308, 310, and 312. In various embodiments, the parsed EAS message data fields may be sent out on one or both of channels 224, 226 as soon as the message data fields are parsed from the EAS signal. In various embodiments, the one or more of the message data fields are formatted before they is sent out on one or both of channels 224, 226.

Figure 3:
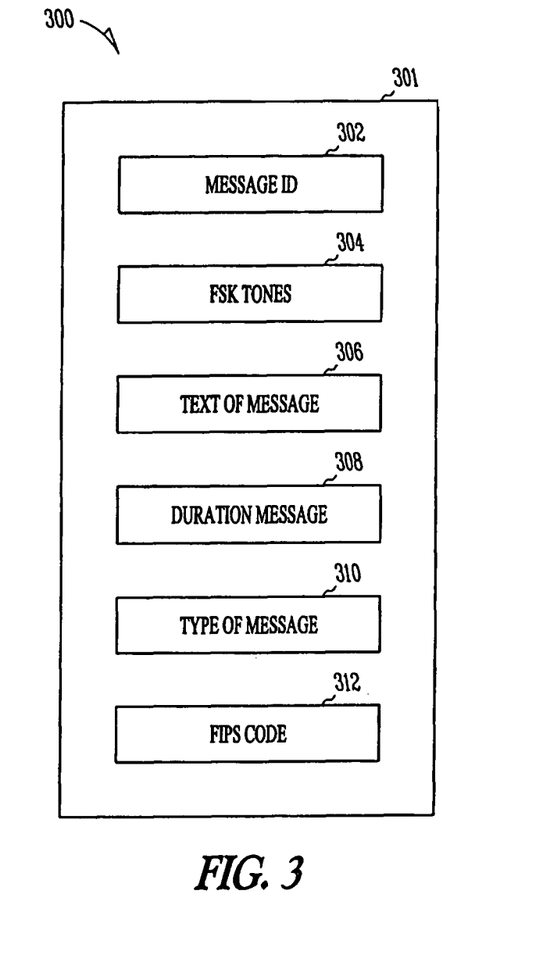
FIG. 3 is a diagrammatic representation of a table that may be used in various embodiments of the invention to allow EAS notifications to be delivered over IP delivery platforms.

FIG. 3 is a diagrammatical representation 300 of a table 301 including a plurality of message data fields storage blocks 302, 304, 306, 308, 310, and 312. The table 301 may comprise a data structure stored in a memory. The plurality of message data fields storage blocks 302, 304, 306, 308, 310, and 312 may include blocks into which various parts of a message associated with an EAS message are entered upon being parsed from a received EAS signal. Thus, the table 301 may include a message ID storage block 302, a FSK (frequency shift keying) tones storage block 304, a text of message storage block 306, a duration of message storage block 308, a type of message storage block 310, and a FIPS code storage block 312. In various embodiments, the message ID storage block 302 is used to store the EAS message data field associated with a message ID portion of an EAS message parsed from the received EAS signal. In various embodiments, the FSK tones storage block 304 is used to store the EAS message data field associated with a FSK tones portion of an EAS message parsed from a received EAS signal. In various embodiments, the FSK tones stored in the FSK tones storage block 304 are formatted in an IP format. Potential formats may include the .wav and MP3 formats, among others.

The .wav file format (also known as the Waveform Audio File Format(WAVE)), is a subset of the Microsoft® RIFF (Resource Interchange File Format) specification for the storage of multimedia files. The .wav file format can be used to store digital audio (waveform) data, and supports a variety of bit resolutions, sample rates, and channels of audio. RIFF is a Windows® file format for storing chunks of multi-media data, associated descriptions, formats, playlists, etc. For more information about the RIFF specification, please consult the Microsoft® Software Developer's Kit, Multimedia Standards Update, Rev. 3.0, April 1994, and later versions.

For more information regarding Moving Pictures Experts Group (MPEG) standards, including MP3 (MPEG-1 Audio, Layer 3), please refer to the various individual MPEG Standards, including one or more of Parts 1, 2, and 4 of the ISO/IEC JTC1/SC29/WG11 International Standard, such as, for example, Coding Of Moving Pictures And Associated Audio For Digital Storage Media At Up To About 1.5 Mbit/s, MPEG-1 International Standard, ISO/IEC 11172 Parts 1-5, 1993-1998; Generic Coding Of Moving Pictures And Associated Audio Information, MPEG-2 International Standard, ISO/IEC 13818 Parts 1-10, 1996-2000; and Coding of Moving Pictures and Audio, MPEG-4 International Standard, ISO/IEC JTC1/SC29/WG11 N4668, March 2002.

In various embodiments, the text of message storage block 306 is used to store the EAS message data field associated with a text message portion of an EAS message parsed from a received EAS signal. In various embodiments, the duration of message field 308 is used to store the EAS message data field associated with the duration of message portion of an EAS message parsed from a received EAS signal. In various embodiments, the type of message storage block 310 is used to store the EAS message data field associated with a type of message portion of an EAS message parsed from a received EAS signal. In addition, table 301 may include a storage block to store the FIPS code portion of an EAS message parsed from a received EAS signal. The various EAS message data fields may maintain their relationship by association with the message ID number parsed from the received EAS signal.

Returning to FIG. 2, the FIPS code and EAS message proxy 204 may be coupled to a subscriber management database 206 by channel 224. Channel 224 is not limited to a particular type of channel, and may include any type of channel capable of providing the required communications between FIPS code and EAS message proxy 204 and subscriber management database 206. In various embodiments, channel 224 is used to transfer the FIPS code stored in the FIPS code storage block 312 of FIG. 3 from the FIPS code and EAS message proxy 204 to subscriber management database 206. A message ID stored in storage block 302 may be transferred over channel 224 from the FIPS code and EAS message proxy 204 to subscriber management database 206 wherein the message ID associates the FIPS code with the EAS message from which the FIPS code was parsed.

Figure 4A:
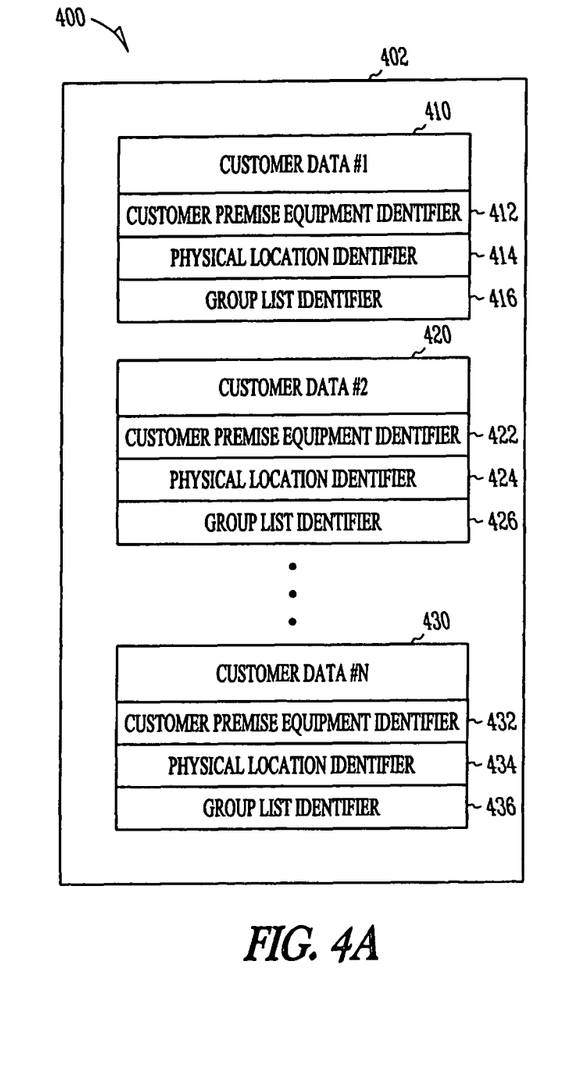
FIG. 4A is a diagrammatic representation of a customer list that may be used in various embodiments of the invention to allow EAS notifications to be delivered over IP delivery platforms.

In various embodiments, subscriber management database 206 includes a customer list 402 as shown in the diagrammatic representation 400 of FIG. 4A. In various embodiments, customer list 402 includes customer data blocks 410, 420, and 430 wherein each customer data block 410, 420, and 430 includes various data associated with a customer or subscriber. Subscribers may include customers who have legitimate access to one or more IP networks over which the instant messaging server 208 may broadcast. Customer list 402 is not limited to any particular number of customer data blocks. The data in the customer data blocks 410, 420, 430 is not limited to any particular type of data, but may include, by way of example, a subscriber's name, address, phone number, and other information describing what services the customer or subscriber is registered to receive or utilize. In the customer list 402, customer data blocks 410, 420, and 430 may include one or more customer premise equipment identifiers 412, 422, and 432 respectively. Customer premise equipment identifiers 412, 422, and 432 are not limited to any particular type of identifier. In various embodiments, customer premise equipment identifiers 412, 422, and 432 comprise an IP address. Customer premise equipment identifiers 412, 422, and 432 may enable subscriber management database 206 to identify and address broadcasts to the particular customer premise equipment devices 250, 251, 252, 270, 272, and 280 associated with a particular customer or subscriber, as illustrated in FIG. 2.

In various embodiments, the data in customer list 402 associated with each customer or subscriber includes physical location identifiers 414, 424, and 434, wherein each physical location identifier is associated with a customer or subscriber corresponding to the customer or subscriber identified in customer data blocks 410, 420, and 430 respectively. In various embodiments, the physical location identifiers 414, 424, and 434 may comprise a United States Postal ZIP code. In various embodiments, physical location identifiers 414, 424, and 434 may comprise data corresponding to the geographic location of the customer or subscriber corresponding to the customer or subscriber identified in customer data blocks 410, 420, and 430 respectively.

Figure 4B:
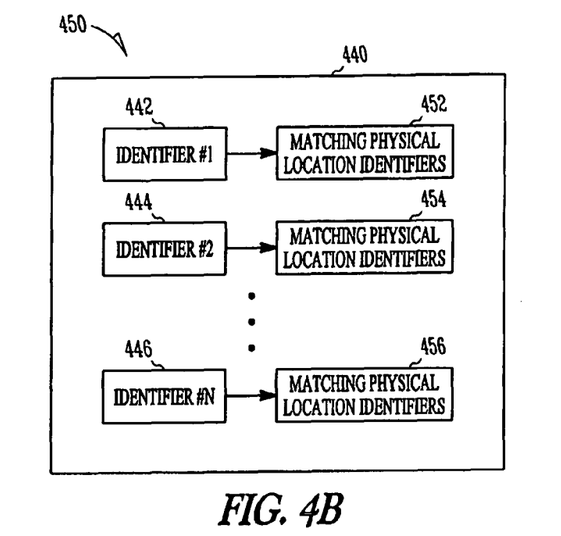
FIG. 4B is a diagrammatic representation of an index table that may be used in various embodiments of the invention to allow EAS notifications to be delivered over IP delivery platforms.

In various embodiments, subscriber management database 206 includes an index table 440 as shown in the diagrammatic representation 450 of FIG. 4B. The index table 440 may include a plurality of identifiers 442, 444, and 446. The index table 440 is not limited to any particular number of identifiers. The index table 440 may include matching physical location identifiers 452, 454, 456. Each identifier 442, 444, and 446 may be associated with one or more of the matching position location identifiers 452, 454, and 456, as shown in FIG. 4B by arrows. By way of example and not by way of limitation, identifier 442 may be associated with matching physical location identifiers 452, identifier 444 may be associated with matching physical location identifiers 454, and identifier 446 may be associated with matching physical location identifiers 456. However, the association of identifiers with matching physical location identifiers is not limited to any particular way of performing the association, and may include any way of associating one set of data with another as would be recognized by those of ordinary skill in the art.

The table 440 may enable subscriber management database 206 to generate an affected subscriber list (for example, the affected subscriber list 481 shown in FIG. 4C) based on one or more identifiers 442, 444, and 446 and the FIPS code received from FIPS code and EAS message proxy 104. By way of example, and not by way of limitation, the identifiers 442, 444, and 446 may include a FIPS codes associated with each of the identifiers 442, 444, and 446. Each FIPS code may correspond to a particular physical location or geographic area. In the associated matching physical location identifiers 452, 454, and 456 may be stored physical location identifiers associated with one or more customers or subscribers which coincide with the physical location or geographic area designated by the associated FIPS codes. By way of example, matching physical location identifies 452, 454, and 456 may include some or all of the United States Postal ZIP codes that cover the one or more physical locations that coincide with the associated FIPS code in the identifiers 442, 444, and 446.

Upon receiving a FIPS code from FIPS code and EAS message proxy 104, subscriber management database 106 may match the received FIPS code to an identifier 442, 444, and 446. Once a matching identifier is located in table 440, the associated matching physical location identifiers may be determined from the associated matching physical location identifiers 452, 454, 456 using, for example, index table 440. The associated matching physical location identifiers may include numbers or codes that match one more of the physical location identifiers 414, 424, and 434 in customer list 402.

Figure 4C:
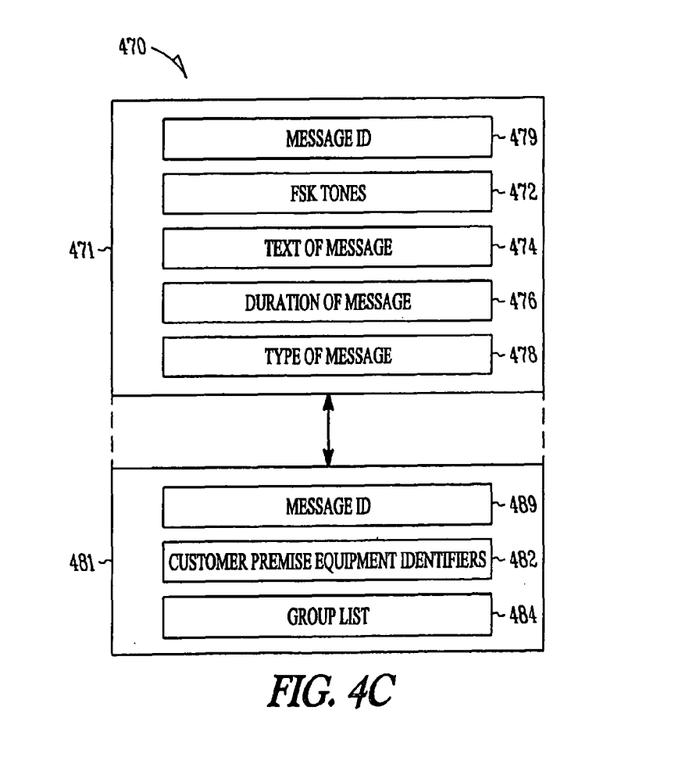
FIG. 4C is a diagrammatical representation of an affected subscriber list and message data fields used in various embodiments of the invention to allow EAS notifications to be delivered over IP delivery platforms.

The subscriber management database 206 may use the associated matching physical location identifiers to review each of the physical location identifiers 414, 424, and 434 in customer list 402, and generate an affected subscriber list, for example, affected subscriber list 481 as shown in FIG. 4C. The subscriber management database 206 may generate the affected subscriber list 481 by adding to the affected subscriber list 481 any customer premise equipment identifiers 412, 422, and 432 associated with a customer or subscriber whose customer data 410, 420, or 430 includes a physical location identifier 414, 424, 434 that matches the associated matching physical location identifiers used to review customer list 402.

FIG. 4C illustrates a diagrammatic representation 470 including one or more message data fields 471, and an affected subscriber list 481. Message data fields 471 are discussed in more detail below. The affected subscriber list 481 may include customer premise equipment identifiers 482. Customer premise equipment identifiers 482 may be associated with one or more of the customers or subscribers whose physical location identifier 414, 424, 434 were selected during the review of customer list 402. Affected subscriber list 481 may include message ID 489. Message ID 489 may be the message ID 302 passed from the FIPS code and EAS message proxy 204 to the subscriber management database 206, wherein message ID 489 associates the affected subscriber list 481 with the EAS message from which the FIPS code used as the identifier to generate the affected subscriber list 481 was parsed. The affected subscriber list 481 may be passed to instant messaging server 208 using channel 228.

In various embodiments, the subscription management database 206 may, as part of generating an affected subscriber list, generate a group list, for example, the group list 484 as shown in FIG. 4C. A group list, by way of example but not by way of limitation, may include a list of subscribers who are, for example, Spanish speaking, and want any broadcasts sent to them to be in Spanish. In various embodiments, group list identifiers 416, 426, and 436 as shown in FIG. 4A may comprise additional data included in customer list 402 and associated with a particular customer or subscriber, and may be used to group one or more subscribers on the affected subscriber list into one or more group lists. Group lists may be used to indicate that any message data fields associated with the customers or subscribers in the group list may require performing additional processing on a broadcast message. For example, customers or subscribers included on a group list may require that any messages sent to them may need to appear in a particular language, for example Spanish, when the message is displayed on their particular customer's IP television 260, 261, or 262, or the customer's computer 270, 272, or the customer's IP telephone 280.

In the system 200, instant messaging server 208 may be coupled to the FIPS code and EAS message proxy 204 through channel 226. Channel 226 is not limited to any particular type of channel and may include any type of channel capable of provided the required communication between instant messaging server 208 and FIPS code and EAS message proxy 204. In system 200, channel 226 may be used to transfer information from the FIPS code and EAS message proxy 204 to the instant messaging server 208, including the message ID stored in message data fields storage block 302, the FSK tones stored in message data fields storage block 304, the text of message stored in the message data fields storage block 306, the duration of message stored in the message data fields storage block 308, and the type of message stored in the message data fields storage block 310 associated with a particular EAS message.

The instant messaging server 208 may include one or more message data fields, for example, message data fields 471 as shown in FIG. 4C. FIG. 4C illustrates a diagrammatic representation 470 including message data fields 471, which may include FSK tones 472, text of message 474, duration of message 476, type of message 478. In addition, message data fields 471 may include message ID 479. Message data fields 471 may be used to store the corresponding data message fields transferred to the instant messaging server 208 from FIPS code and EAS message proxy 204.

In various embodiments, instant messenger server 208 may generate a broadcast signal 289 by matching the message ID 479 from a message data fields 471 with a message ID 489 from an affected subscriber list 481, wherein the combination of 471 and 481 includes one or more message data fields parsed from a particular EAS message, along with the customer premise equipment identifiers associated with the physical locations corresponding to the FIPS code parsed from the same EAS message.

The instant messaging server 208 may generate a broadcast signal 289 in an IP format capable of being transmitted over one or more IP networks. The broadcast signal 289 may include, by way of example but not by way of limitation, the affected subscriber list 481 in an IP format capable of being transmitted over one or more IP networks 212. The broadcast signal 289 may include, by way of example but not by way of limitation, the message data fields 471 in an IP format capable of being transmitted over one or more IP networks 212. System 200 shows by way of example, but not by way of limitation, channel 210 coupled to instant messaging server 208 through channel 230. Channel 210 may be coupled through channel 231 to IP network 212. Channel 210 may include a router. Channel 210 may include a switch. IP network 212 may couple to one or more of the customer premise equipment devices 250, 251, 252, 270, 272, and 280. Customer premise equipment devices 250, 251, 252, 270, 272, and 280 may be coupled to IP network 212 through channels 240, 241, 242, 243, 244, and 245 respectively. Channels 240, 241, 242, 243, 244, and 245 are not limited to any particular type of channel, and may include any type of channel capable of providing the required communications between IP network 212 and channels 240, 241, 242, 243, 244, and 245.

Included in the broadcast signal 289 from instant messaging server 208 may be the customer premise equipment identifiers 482 of the affected customers, so that when a customer premise equipment device, for example 250, 251, 252, 270, 272, or 280 detects its own customer premise equipment identifier as part of a broadcast signal 289, the customer premise equipment device will receive the signal and cause the included EAS message to be displayed, for example, on the customer's IP television 260, 261, or 262, or the customer's computer 270, 272, or the customer's IP telephone 280.

Instant messaging server 208 is not limited to any particular type of instant messaging server. By way of example by not by way of limitation, instant messaging server 208 may include the instant messaging servers provided by the Microsoft Corporation, America OnLine, Inc., or Yahoo! Inc. Use of the instant messaging server 208 allows the broadcast signal 289 to be provided in an IP format that can be directed to particular subscribers based in the customer premise equipment identifiers included with the broadcast signal 289. In addition, the format of the broadcast signal from the instant messaging server 208 allows customer premise equipment devices (for example, set top boxes) associated with a subscriber's IP television to receive the EAS message contained within the broadcast signal. Further, the IP format of the broadcast signal may allow a subscriber's computer, for example computers 270 and 272, or other devices, such as IP telephone 280, that are connected to the IP network receiving the broadcast signal to display the EAS message included in the broadcast signal.

In various embodiments, customer premise equipment devices 250, 251, and 252 may include set top boxes. In various embodiments, the broadcast signal from the instant messaging server 208 may activate a subscriber's set top box if the list included with the broadcast signal includes the customer premise equipment identifier associated with the subscriber's set top box. In various embodiments, if the set top boxes 250, 251, and 252 receive a broadcast signal from the instant messaging server 208 that includes the customer premise equipment identifier that uniquely identifies the subscriber's set top box, the set top box will activate, or turn on, the subscriber's IP television 260, 261, 262. In the event the subscriber's IP television is already turned on, the format of the EAS message included in the broadcast signal from the instant messaging server 208 may allow the EAS message to be displayed on whatever channel the IP television 260, 261, and 262 is already turned to. In various embodiments, the EAS message may be displayed on the subscriber's IP television using only a portion of the visible screen, thus allowing the subscriber to view the EAS message while continuing to view the portions of the current broadcast of the tuned channel not covered by the EAS message.

Figure 5:
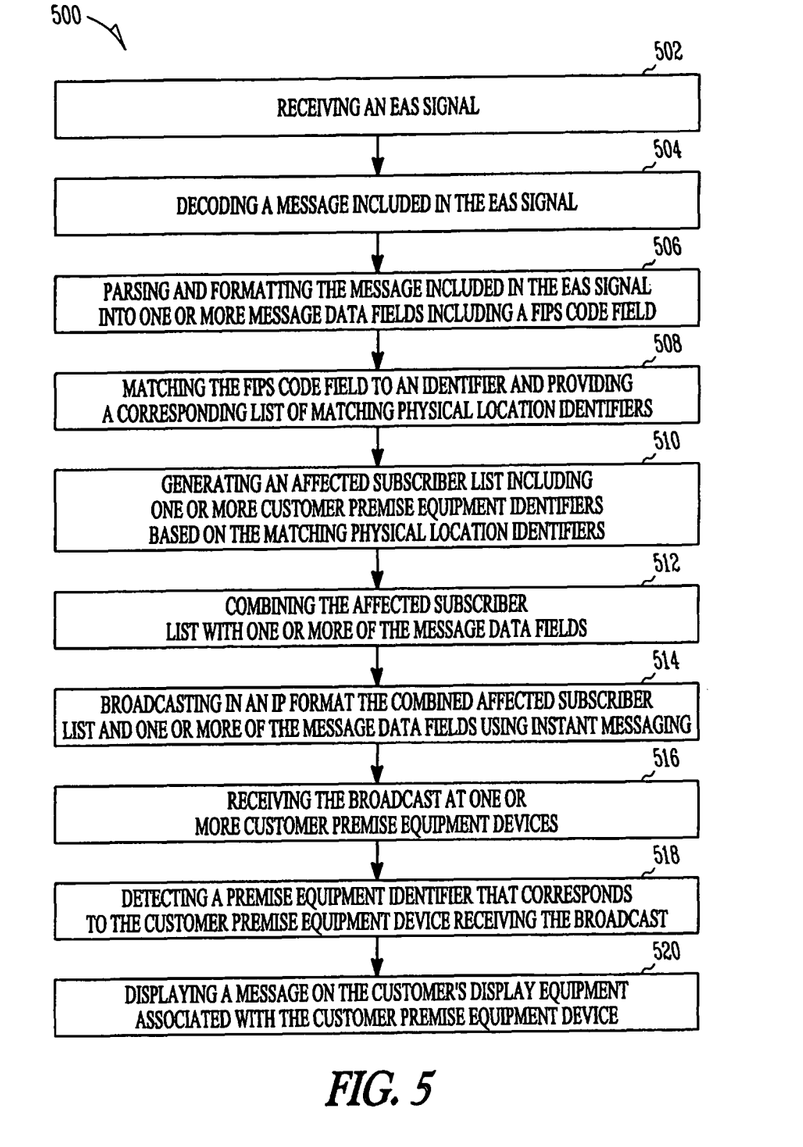
FIG. 5 presents a flow chart illustrating a method, according to an embodiment of the invention, to allow EAS notifications to be delivered over IP delivery platforms.

FIG. 5 illustrates a flow chart depicting a method 500 according to an embodiment of the invention. Method 500 may commence at block 502 by receiving an EAS signal. Method 500 may proceed at block 504 by decoding a message included in the EAS signal. In various embodiments of method 500, decoding a message includes demodulation of the EAS message from the carrier signal used to transmit the EAS signal. Method 500 may include, at block 506, parsing and formatting the message included in the EAS signal into one or more message data fields. In an embodiment, parsing includes parsing a FIPS code. Parsing may include parsing the EAS message to provide one or more of the following: a message ID, FSK tones, test of message, duration of message, type of message. In various embodiments, separating the various parts of the message into message data fields includes storing the message data fields in a table identified by a message identification number. The message identification number may be the message ID number parsed from the EAS message. In various embodiments, parsing includes separating a FIPS code in the EAS message and entering the FIPS code into a message data fields storage block. In various embodiments, formatting includes changing the format of various parts of the message from a format present in the EAS signal into a different format.

Method 500 may include, at block 508, matching a FIPS code field to an identifier, and providing a corresponding list of matching physical location identifiers. In an embodiment, the matching physical location identifiers include one or more United States Postal ZIP codes. In an embodiment, the matching physical location identifier is a geographical identifier. Method 500 may include, at block 510, generating an affected subscriber list including one or more customer premise equipment identifiers based on the matching physical location identifiers. Method 500 may include, at block 512, combining the affected subscriber list with one or more of the message data fields. Method 500 may include, at block 514, broadcasting the combined affected subscriber list and one or more message data fields using instant messaging. In an embodiment of method 500, the combined affected subscriber list and one or more of the message data fields may be broadcast over an IP network. In an embodiment, the combined affected subscriber list and one or more of the message data fields are broadcast through one or more channels to one or more customer premise equipment devices.

Method 500 may include, at block 516, receiving the broadcast at one or more customer premise equipment devices. Method 500 may include, at block 518, using a customer premise equipment device to detect a customer premise equipment identifier that corresponds to the customer premise equipment device receiving the broadcast. Method 500 may include, at block 520, displaying a message on the customer's display equipment associated with the customers premise equipment device.

It should be noted that the methods described herein do not have to be executed in the order described, or in any particular order. Moreover, various activities described with respect to the methods identified herein can be executed in repetitive, simultaneous, serial, or parallel fashion. Information, including parameters, commands, operands, and other data, can be sent and received in the form of one or more carrier waves.

Figure 6:
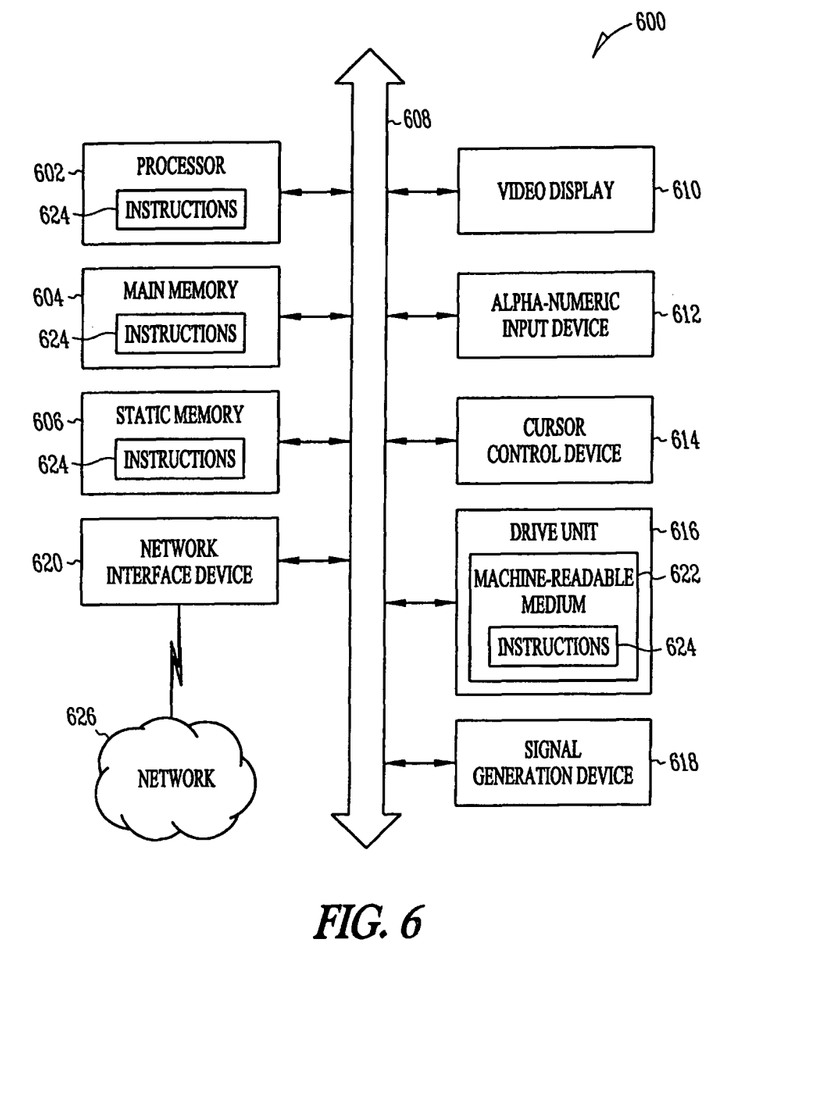
FIG. 6 is a diagrammatic representation of a machine, in the form of a computer system, within which a set of instructions for causing the machine to perform any one of the methodologies discussed herein, may be executed.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, IP telephone, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker) and a network interface device 620.

The disk drive unit 616 may include a machine-readable medium 622 on which is stored one or more sets of instructions (e.g., software 624) embodying any one or more of the methodologies or functions described herein, including those methods illustrated in FIG. 5. The instructions 624 may also reside, or be stored in, completely or at least partially, within the main memory 604, the static memory 606, and/or within the processor 602 during execution thereof by the computer system 600. The main memory 604 and the processor 602 also may constitute machine-readable media. The instructions 624 may further be transmitted or received over a network 626 via the network interface device 620.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments described. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 7 are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system comprising:
a proxy server coupled to an emergency alert system receiver operable to parse emergency alert signal message data fields from an emergency alert system signal received from the emergency alert system receiver into a frequency shift keying tones field, a federal information processing standard code field, a text of message field, and a message ID field associated with the text of message field, wherein the frequency shift keying tones field is adapted to store frequency shift keying tones formatted in an internet protocol audio format;
a subscriber management database coupled to the proxy server and operable to receive the federal information processing standard code field and the message ID field from the proxy server and to generate an affected subscriber list including a customer premise equipment identifier and an associated message ID by matching the federal information processing standard code to a matching physical location identifier, wherein the subscriber management database includes a table including customer equipment identifiers corresponding to physical location identifiers, the subscriber management database further operable to generate an additional processing group list and a language group list from the affected subscriber list based on group list identifiers included in the subscriber management database, wherein any message data fields associated with affected subscribers in the additional processing group list require additional processing of a broadcast message directed to these affected subscribers and affected subscribers in the language group list require messages sent in a particular language; and
an instant messaging server coupled to the proxy server and to the subscriber management database, the instant messaging server being operable to receive the affected subscriber list including the customer premise equipment identifier, the associated message ID, the additional processing group list, the language group list from the subscriber management database, the text of message field, the message ID field associated with the text of message field, and the frequency shift keying tones formatted in an internet protocol audio format from the proxy server, the instant messaging server being further operable to generate a broadcast signal using instant messaging including the affected subscriber list in an Internet Protocol (IP) format and the text of message field in an IP format by matching the associated message ID, the message ID field associated with the text of the message field, and the frequency shift keying tones formatted in an internet protocol audio format, the broadcast message using instant messaging operable to be displayed in real-time on a device associated with the customer premise equipment identifier included in the broadcast signal, including performing the additional processing of the broadcast message for the messages directed toward the affected subscribers from the affected subscriber list who are also included in the additional processing group list, wherein the customer premise equipment identifier is associated with a set top box which is associated with an IP television and the broadcast signal is adapted to cause the set top box to turn on the IP television, the instant messaging server operable to broadcast the broadcast signal in the IP format to the customer premise equipment device over an IP network, the customer premise equipment device, the set top box, and the IP television coupled to the instant messaging server through the IP network, the customer premise equipment device operable to detect a customer premise equipment identifier that identifies the customer premise device and, responsive to detection, receive and display the broadcast signal, including the text of message field.

2. The system of claim 1, wherein the customer premise equipment device includes a computer coupled to the instant messaging server through the IP network.

3. The system of claim 1, wherein the customer premise equipment device includes an IP telephone coupled to the instant messaging server through the IP network.

4. The system of claim 1, further including the proxy server operable to store parsed emergency alert signal message data fields in a Waveform Audio File format.

5. The system of claim 1, further including the proxy server operable to store parsed emergency alert signal message data fields in a Moving Pictures Expert Group MP3 format.

6. A method comprising:
receiving an emergency alert system signal including a federal information processing standard code and message data fields;
parsing and formatting at a proxy server a message included in the emergency alert system signal into the message data fields including a frequency shift keying tones field, a federal information processing standard code field, a message ID field, and a text of message field, wherein the frequency shift keying tones field is adapted to store the frequency shift keying tones formatted in an internet protocol audio format;
providing the federal information processing standard code field and the message ID field to a subscriber management database;
generating at the subscriber management database an affected subscriber list including a customer premise equipment identifier and an associated message ID by matching the federal information processing standard code to a matching physical location identifier using a table including customer premise equipment identifiers corresponding to physical location identifiers;
generating at the subscriber management database an additional processing group list and a language group list from the affected subscriber list based on group list identifiers included in the subscriber management database, wherein any message data fields associated with affected subscribers in the additional processing group list require additional processing of a broadcast message directed to these affected subscribers and affected subscribers in the language group list require messages sent in a particular language;
communicating from the subscriber management database to an instant messaging server the affected subscriber list, the additional processing group list, the language group list, and an associated message ID;
communicating from the proxy server to the instant messaging server the message ID field, the text of message field, and the frequency shift keying tones formatted in an internet protocol audio format;
generating at the instant messaging server a broadcast signal including the affected subscriber list in an Internet Protocol (IP) format, the text of message field in an IP format, and the frequency shift keying tones formatted in an internet protocol audio format by matching the associated message ID and the message ID field, including performing the additional processing of the broadcast message for the messages directed toward the affected subscribers from the affected subscriber list who are also included in the additional processing group list; and
broadcasting in an IP format a combined affected subscriber list and the message data fields using instant messaging, wherein the message data fields are operable to be displayed in real-time on a customer premise equipment device associated with one of the customer premise equipment identifiers included in the broadcast signal, the customer premise equipment device including a set top box which is associated with an IP television, the customer premise equipment device, set to box, and IP television coupled to the instant messaging server through an IP network, the customer premise equipment device operable to detect a customer premise equipment identifier that identifies the customer premise device, the customer premise device receiving and displaying the broadcast signal, including the text of message field, in response to detection of the customer premise equipment identifier that identifies the customer premise device, and the broadcast signal is adapted to cause the set top box to turn on the IP television.

7. The method of claim 6, wherein generating at the subscriber management database an affected subscriber list including a customer premise equipment identifier and an associated message ID includes:
providing a customer list including a physical location identifier associated with each customer on the customer list, and providing a customer premise equipment identifier block including a list of identifiers for customer premise equipment devices associated with each physical location identifier.

8. The method of claim 6, further including:
receiving at a plurality of customer premise equipment devices the broadcast including the affected subscriber list and the message data fields;
detecting in the broadcast affected subscriber list a customer premise equipment identifier associated with a particular one of the plurality of customer premise equipment devices; and
responding to the detection by receiving and displaying at the particular one of the plurality of customer premise equipment devices one of the message data fields included in the broadcast signal.

9. The method of claim 6, wherein broadcasting in an IP format a combined affected subscriber list and the message data fields using instant messaging includes:
directing the broadcasting to particular subscribers based on the customer premise equipment identifiers included in the broadcast signal.

10. A non-transitory machine readable medium storing computer program instructions, which, when executed on a processor, cause the processor to perform operations comprising:

receiving an emergency alert system signal including a federal information processing standard code and message data fields;

parsing and formatting at a proxy server a message included in the emergency alert system signal into the message data fields including a frequency shift keying tones field, a federal information processing standard code field, a message ID field, and a text of message field, wherein the frequency shift keying tones field is adapted to store the frequency shift keying tones formatted in an internet protocol audio format;

providing the federal information processing standard code field and the message ID field to a subscriber management database;

generating at the subscriber management database an affected subscriber list including a customer premise equipment identifier and an associated message ID by matching the federal information processing standard code to a matching physical location identifier using a table including customer premise equipment identifiers corresponding to physical location identifiers;

generating at the subscriber management database an additional processing group list and a language group list from the affected subscriber list based on group list identifiers included in the subscriber management database, wherein any message data fields associated with affected subscribers in the additional processing group list require additional processing of a broadcast message directed to these affected subscribers and affected subscribers in the language group list require messages sent in a particular language;

communicating from the subscriber management database to an instant messaging server the affected subscriber list, the additional processing group list, the language group list, and an associated message ID;

communicating from the proxy server to an instant messaging server the message ID field, the text of message field, and the frequency shift keying tones formatted in an internet protocol audio format;

generating at the instant messaging server a broadcast signal including the affected subscriber list in an Internet Protocol (IP) format, the text of message field in an IP format, and the frequency shift keying tones formatted in an internet protocol audio format by matching the associated message ID and the message ID field, including performing the additional processing of the broadcast message for the messages directed toward the affected subscribers from the affected subscriber list who are also included in the additional processing group list; and broadcasting in an IP format a combined affected subscriber list and the message data fields using instant messaging, wherein the message data fields are operable to be displayed in real-time on a customer premise equipment device associated with one of the customer premise equipment identifiers included in the broadcast signal, the customer premise equipment device including a set top box which is associated with an IP television, the customer premise equipment device, set top box, and IP television coupled to the instant messaging server through an IP network, the customer premise equipment device operable to detect a customer premise equipment identifier that identifies the customer premise device, the customer premise device receiving and displaying the broadcast signal, including the text of message field, in response to detection of the customer premise equipment identifier that identifies the customer premise device, and the broadcast signal is adapted to cause the set top box to turn on the IP television.

\* \* \* \* \*